(12) United States Patent
Herp et al.

(10) Patent No.: US 12,331,720 B2
(45) Date of Patent: Jun. 17, 2025

(54) WIND TURBINE REPLACEMENT SCHEDULE

(71) Applicant: Siemens Gamesa Renewable Energy A/S, Brande (DK)

(72) Inventors: Juergen Herp, Odense M (DK); Niels Lovmand Pedersen, Gedved (DK); Benedikt Wiese, Odense C (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 636 days.

(21) Appl. No.: 17/613,534

(22) PCT Filed: Jun. 2, 2020

(86) PCT No.: PCT/EP2020/065188
§ 371 (c)(1),
(2) Date: Nov. 23, 2021

(87) PCT Pub. No.: WO2020/249424
PCT Pub. Date: Dec. 17, 2020

(65) Prior Publication Data
US 2022/0252050 A1   Aug. 11, 2022

(30) Foreign Application Priority Data
Jun. 14, 2019   (EP) .................................... 19180276

(51) Int. Cl.
*F03D 17/00*   (2016.01)
*F03D 7/02*    (2006.01)

(52) U.S. Cl.
CPC ........... *F03D 17/00* (2016.05); *F03D 7/0292* (2013.01); *F05B 2260/821* (2013.01); *F05B 2270/32* (2013.01); *F05B 2270/334* (2013.01); *F05B 2270/335* (2013.01)

(58) Field of Classification Search
CPC .. F03D 17/00; F03D 7/0292; F05B 2260/821; F05B 2270/32; F05B 2270/334; F05B 2270/335
See application file for complete search history.

(56) References Cited

U.S. PATENT DOCUMENTS

| | | | |
|---|---|---|---|
| 8,577,509 B2 | 11/2013 | Ong et al. | |
| 8,587,140 B2 | 11/2013 | Egedal et al. | |
| 8,725,456 B1 * | 5/2014 | Saha | G05B 23/0283 702/182 |
| 9,816,483 B2 | 11/2017 | Nakamura et al. | |
| 2015/0176569 A1 * | 6/2015 | Karikomi | G01W 1/00 702/34 |
| 2019/0101103 A1 * | 4/2019 | Haseba | F03D 17/00 |
| 2019/0317952 A1 * | 10/2019 | Li | G06F 16/2246 |

FOREIGN PATENT DOCUMENTS

WO   2013046193 A2   4/2013

OTHER PUBLICATIONS

International Search Report & Written Opinion for PCT/EP2020/065188 issued Sep. 2, 2020.

* cited by examiner

*Primary Examiner* — Mohamed Charioui
*Assistant Examiner* — Christine Y Liao
(74) *Attorney, Agent, or Firm* — Schmeiser, Olsen & Watts LLP

(57) ABSTRACT

Provided is a method and arrangement of estimating replacement schedule of a, in particular mechanical, component of a wind turbine, the method comprising: estimating remaining producible energy until this component is to be replaced.

18 Claims, 2 Drawing Sheets

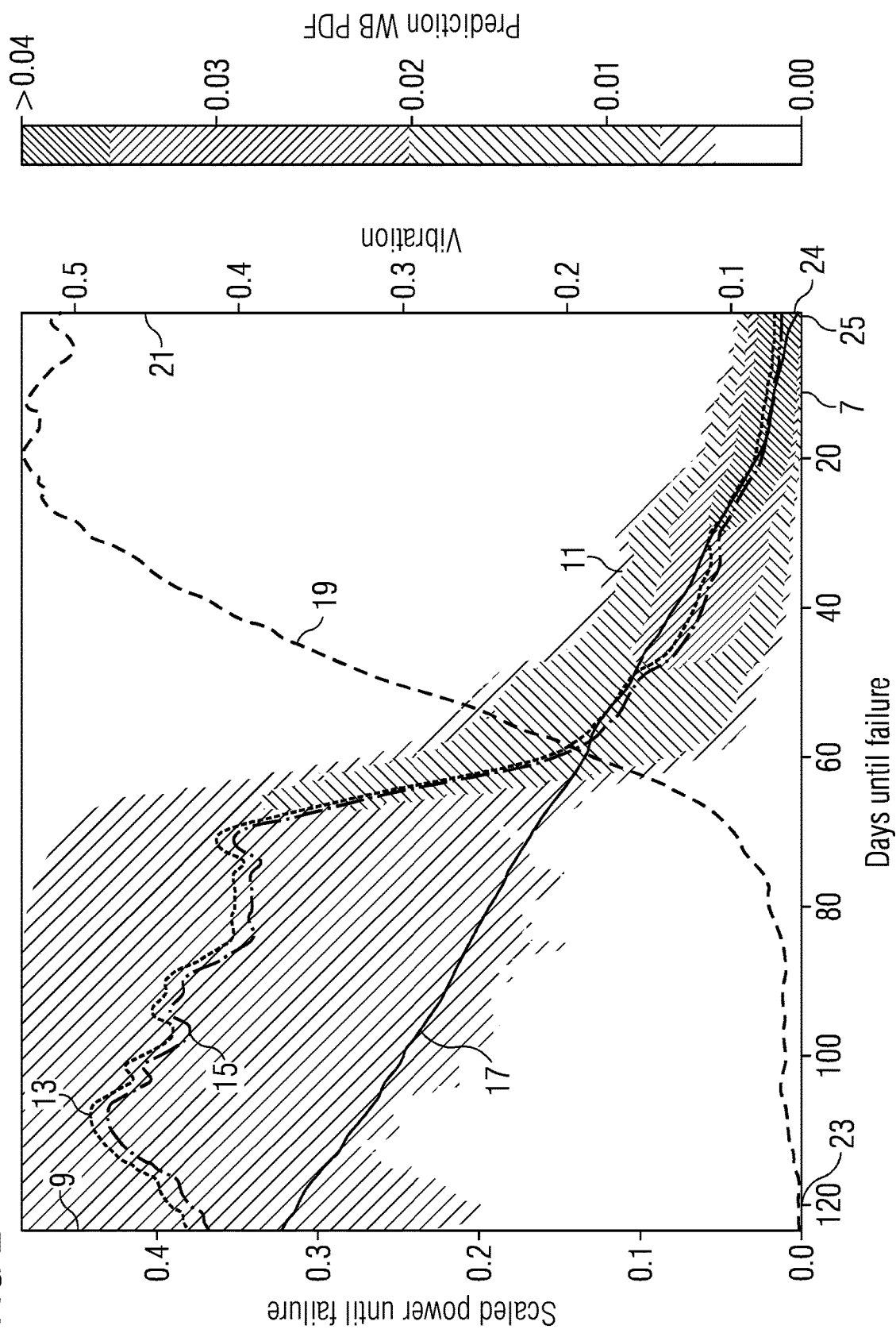

WIND TURBINE REPLACEMENT SCHEDULE

CROSS-REFERENCE TO RELATED APPLICATIONS

Figure 1:
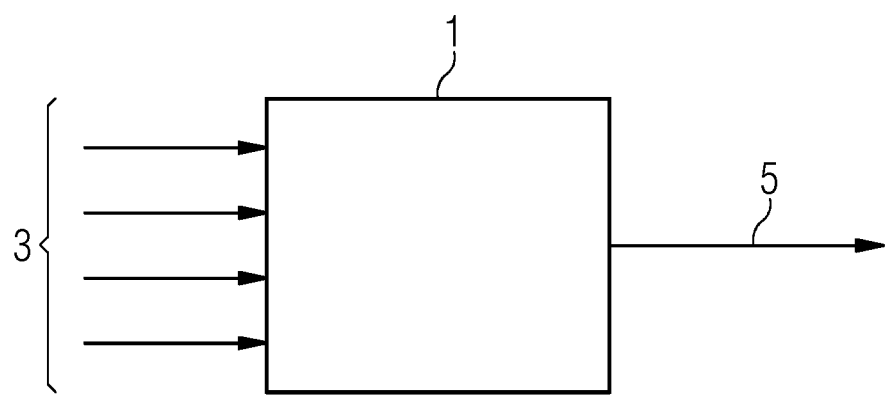

This application claims priority to PCT Application No. PCT/EP2020/065188, having a filing date of Jun. 2, 2020, which claims priority to EP Application No. 19180276.8, having a filing date of Jun. 14, 2019, the entire contents both of which are hereby incorporated by reference.

FIELD OF TECHNOLOGY

The following relates to a method of estimating a replacement schedule of a component of a wind turbine, relates to a method of operating a wind turbine and further relates to an arrangement for estimating a replacement schedule of a component of a wind turbine.

BACKGROUND

A wind turbine comprises a number of components which are susceptible to wear or even malfunction or damage due to operation. In particular, mechanical components such as a bearing, in particular of a main rotation shaft, may be subject to wear and eventually to malfunctioning. Thus, parameters that are related to the (health) state of one or more wind turbines or one or more wind turbine components must be considered when controlling the operation of a wind turbine. These parameters might include temperature, noise, vibration, and other state-related measurements, for example performed directly at the component(s). Analysis of these measurement results may allow operators to assess at which point in time a considered component reaches a critical state and must be shut down. When this happens, maintenance tasks need to be performed.

However, detecting the time in the future at which the wind turbine or the wind turbine component needs to be shut down is widely not resolved. The conventional methods predict remaining useful lifetime (RUL) of turbines or their components. However, the RUL only provides a temporal scale for a developing critical state. It has however been observed that the prediction of a remaining useful lifetime does not in all situations enable to appropriately schedule maintenance or replacement and does not in all situations allow the optimized control of a wind turbine.

Thus, there may be a need for a method of estimating replacement schedule of a component of a wind turbine and there may be a corresponding need of a respective arrangement for estimating a replacement schedule of a component of a wind turbine, wherein the disadvantages or problems associated with the conventionally known methods and arrangement are at least partly overcome.

SUMMARY

An aspect relates to a method of estimating replacement schedule of a, in particular mechanical, component of a wind turbine, the method comprising: estimating remaining producible energy until this component is to be replaced (also referred to as remaining generated power, RGP).

The method may for example be performed by a module or a portion of a wind turbine controller or any processor comprised within the wind turbine.

According to other embodiments of the present invention the method may be performed by a processor or computer located outside of the wind turbine or not being part of the wind turbine—e.g., in a monitoring office, in a wind park controller or running in the cloud.

The component may be a mechanical component, such as a (part of a) bearing of a shaft, in particular a main rotation shaft, which has mounted thereon plural wind turbines blades and which may also be coupled with a generator. The main rotation shaft may on one side have the rotor blades attached (for example via a hub) and at the other end it may directly be coupled with the generator or it may be coupled with an optional gearbox.

Another example for the component may be a gearbox or a portion of a gearbox or a bearing of a secondary shaft, which is for example connected at one end to the gearbox and at the other end is coupled with the generator. As a still other example for the component another bearing may be present for allowing a yawing rotation of the wind turbine nacelle on top of the wind turbine tower. Another example of the component may be a bearing of a pitching system for pitching the individual rotor blades by rotating them around longitudinal axes of the rotor blades. In other embodiments, the component may for example also include an electrical and/or electronic component.

The method may be started when there has been observed, that the considered component shows indication of damage or malfunctioning. The method may allow planning the replacement of the component in the future. Different however from conventionally known methods, the method does not (primarily) output or estimate a remaining useful lifetime (RUL) but may output or estimate a remaining producible energy until this component is to be replaced. The remaining producible energy until this component is to be replaced is the estimation of the energy (for example the integral of the output power) which can still be produced before the component is so hardly damaged that it needs to be replaced. The remaining producible energy estimated by the method may also be referred to as remaining generated power (RGP) in the present application.

The estimating may involve application of machine-learning techniques or a non-linear estimator.

The conventionally estimated remaining useful lifetime, as the name implies, only provides a temporal scale for a developing critical state of a component of the wind turbine. However, the temporal scale is not a physical parameter in the operations of the wind turbine and carries little value in terms of power yield. For example, according to a scenario, during operations it is detected according to the conventional method that a critical state of a rotational part is bound to happen in 30 days. However, it turns out that the next 20 days there is no wind to drive the turbine and clearly the turbine's effective remaining useful lifetime should have been estimated to 50 days. Thus, the conventional method estimates a wrong date or the replacement time of the component. Thereby, the wind turbine may not be operated to optimize power output or to optimize other criteria.

Embodiments of the present invention propose a new measure, rather than the remaining useful lifetime, which relates to the operation and the energy or power yield of the wind turbine. In particular, the estimated remaining producible energy may be continuously monitored and utilized for the determination of a control scheme for operation and maintenance scheduling.

According to an embodiment of the present invention, the method further comprises: detecting a value of a physical quantity indicating a malfunction of the component; starting estimating the remaining producible energy, if the value exceeds a threshold, the method in particular further comprising: estimating the remaining producible energy further based on the detected value of the quantity.

The value of the physical quantity may be measured or may be estimated or inferred from other measured or inferred or estimated quantities. The physical quantity may for example comprise a temperature, vibration, noise, any electrical quantity relating to power output of the wind turbine, rotational speed of a main rotation shaft or a secondary rotation shaft, friction or the like. Depending on the component which is considered, the physical quantity may differ. When it is determined that the value of the physical quantity exceeds the threshold, it may indicate that the component under consideration suffered partial damage or has a problem regarding functioning.

For detecting the value of the physical quantity, one or more sensors may be provided, such as a microphone, an acceleration sensor, a rotational speed sensor, electrical measurement equipment, a temperature sensor and so on. Taking also into account the detected value of the quantity for estimating the remaining producible energy may improve the estimation. In particular, the higher the value of the physical quantity, the higher the degree of a damage of the component. Before the value of the physical quantity exceeds the threshold, the method of estimating may not be performed, since it may be assumed that the component is in a proper healthy condition. Thereby, unnecessarily performing the method involving computational efforts may be avoided.

According to an embodiment of the present invention, the physical quantity indicating the malfunction of the component comprises a vibration and/or noise, in particular measured by a sensor close to the component, wherein the component in particular comprises a bearing, in particular of a main rotation shaft.

The vibration or noise may be measured by a microphone or in an accelerometer for example. This may in particular be useful, when the component includes a bearing. The degree of damage of bearing may appropriately be monitored by monitoring the vibration of the component or the noise generated by the component. In other embodiments, the estimating the remaining producible energy may not take into account as input the detected value of the quantity indicating the malfunction of the component. In some cases, there may be no physical quantity indicating the malfunction of the component available.

According to an embodiment of the present invention, estimating the remaining producible energy is performed during power production of the wind turbine.

When the method is performed during power production of the wind turbine, i.e., during normal operation of the wind turbine, the operation of the wind turbine may be adjusted in dependence of the estimated remaining producible energy. Thereby, power output may be improved and/or load experienced by component of the wind turbine may be optimized, e.g., minimized.

According to an embodiment of the present invention, estimating the remaining producible energy uses machine learning comprising: using a neural network, in particular recurrent neural network, which has been trained by training data from plural (such as between 50 to 1000) training wind turbines, the training data comprising training values of input parameters and a training value of at least one output parameter, the input parameters comprising at least one wind turbine operational parameter and/or at least one ambient condition parameter; the at least one output parameter being indicative for the remaining producible energy until this component is to be replaced.

A neural network may comprise plural network nodes and links between the nodes. A neural network is known to the skilled person. The neural network may comprise an input layer, one or more hidden layers and one output layer. A recurrent neural network (RNN) is a class of artificial neural networks where connections between nodes form a directed graph along a temporal sequence. This may allow to exhibit temporal dynamic behaviour. RNNs can use their internal state (memory) to process sequences of input. The term "recurrent neural network" is used to refer to two broad classes of networks with a similar general structure where one is finite impulse and the other is infinite impulse. Both classes of networks exhibit temporal dynamic behaviour. A finite impulse recurrent network is a directed acyclic graph that can be unrolled and replaced with a strictly feedforward neural network, while an infinite impulse recurrent network is a directed cyclic graph that cannot be unrolled.

Thereby, conventionally available neural networks may be utilized, thereby simplifying the implementation of the method.

The training wind turbines may comprise a same or similar component having same or similar malfunction as the wind turbine under consideration. For example, the components of the training wind turbine may have same type, model, size configuration, age as the component of the wind turbine under consideration. Thereby, the accuracy of the method may be improved. When a same or similar component is present in the training wind turbines as well as in the wind turbine under consideration, the behaviour or evolvement of the constitution of the component during further operation may be expected to be similar or even same.

According to an embodiment of the present invention, estimating the remaining producible energy comprises using a trained neural network comprising: supplying test values of the input parameters to the trained neural network, the test values pertaining to the wind turbine; outputting, by the trained neural network, a (e.g., a parametrization of) probability distribution of the remaining producible energy pertaining to the wind turbine.

The probability distribution may be represented in different manners. For example, a parameterization of a probability distribution may be output. Thus, the estimation method may estimate the parameters of a probability distribution. The probability distribution may e.g., be described by a sum of base functions weighted by coefficients. The coefficients may be obtained by the estimation method. A base function is an element of a subset of function (the basis) in the space of all functions mapping between fixed sets.

Whenever the neural network has been trained, only the test value(s) of the at least one input parameter need to be supplied to the network. Then the neural network outputs the probability distribution of the remaining producible energy as derived from the test value(s) of the at least one input parameter. A probability distribution may indicate for every energy value what is the probability that this energy value equals or corresponds to the remaining producible energy. When the probability distribution is output instead of a single estimated remaining producible energy, it is enabled to generate a number of different statistical parameters from the probability distribution, such as mean, median, quantile and so on. Different statistical parameters may be utilized depending on the application.

According to an embodiment of the present invention, the probability distribution is given for plural points in time in the future. Thereby, replacement scheduling may be performed in an improved manner.

According to an embodiment of the present invention, as estimation of the remaining producible energy at a desired point in time it is used one of: a mean; a median; a mode; a probability density function at the desired point in time.

A mode is a term in statistics expressing a measure for the most common value in a set of data, i.e., where the probability distribution takes its maximum value. A probability density function is a function whose value at any given sample of a random variable provides a relative likelihood of that value.

Thereby, different statistical factors or measures may be derivable from the probability distribution and the particular statistical factor or parameter may be selected based on the particular application.

According to an embodiment of the present invention, training the neural network comprises: weighting the input parameters depending on the training data regarding their importance for arriving at the respective training value of the output parameter by applying a cost function. The cost function may for example involve the neural network weights that needs to be adjusted, a parametrization of a probability distribution, turbine state, input data, and the remaining generated power. The combination of parameters and their importance change with the underlying statistical model defining the cost function.

The neural network may weight that needs to be adjusted, a parametrization of a probability distribution, turbine state, input data, and the remaining generated power. The combination of parameters and their importance may change with the underlying statistical model defining the cost function.

According to an embodiment of the present invention, the at least one wind turbine operational parameter comprises at least one of: a power output; a rotational speed of a rotation shaft at which plural rotor blades are mounted; a torque of a generator; energy diffusion; construction characteristics of the component.

Energy diffusion is the exchange of energy from a region of high to low energy. In this particular case energy diffusion may involve the transfer of heat (from hot to cold) inside and outside the wind turbine indicated by temperature measurements.

Thereby, conventionally available wind turbine operational parameters may be supported. The operational behaviour of the component may depend on one or more of these wind turbine operational parameters. Thereby, estimation of the remaining producible energy may be enabled and improved.

According to an embodiment of the present invention, the at least one ambient condition parameter comprises at least one of: a wind speed; a wind turbulence; a humidity; a temperature.

Also at least one of the ambient condition parameters may influence the operational behaviour of the component. Thus, at least one of the ambient condition parameters may therefore enable to infer the operational behaviour of the component in dependence of this ambient condition parameter.

According to an embodiment of the present invention, the method further comprises indicating to replace the component, if the remaining producible energy is smaller than an energy threshold, in particular substantially zero.

In particular, the point in time when to replace the component may be indicated, wherein the point in time of the proposed replacement may be derived from the remaining producible energy. Thus, the point in time when to replace the component may be a quantity which may be derived from the originally estimated remaining producible energy, e.g., by extrapolation.

According to an embodiment of the present invention it is provided a method of operating a wind turbine, comprising: performing a method according to one of the preceding embodiments; operating the wind turbine for optimizing power output based on estimated remaining producible energy.

Taking into account the estimated remaining producible energy may enable to optimize the operation of the wind turbine for example for optimizing power output and/or improving load or a combination thereof.

According to an embodiment of the present invention it is provided an arrangement for estimating a replacement schedule of a, in particular mechanical, component of a wind turbine, in particular of a wind turbine, the arrangement being adapted to control or perform a method according to one of the preceding claims.

It should be understood that features, which have been described, explained or provided for a method of estimating replacement schedule of a component of a wind turbine, individually or in any combination, may also be applied to the arrangement for estimating a replacement schedule of a wind turbine component, individual or in any combination, according to embodiments of the present invention and vice versa.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a neural network as used in a method of estimating replacement schedule according to an embodiment of the present invention; and FIG. 2 illustrates a plot representing a probability distribution of the remaining producible energy as derived according to an embodiment of the present invention.

DETAILED DESCRIPTION

According to one embodiment, at least one failure state of at least one component (for example bearing) of a wind turbine is detected. After a failure state is identified (for example using a value of a vibration or a noise as measured by a microphone or an accelerometer) the remaining producible energy (also referred to as remaining generated power (RGP)) is estimated. In this context, the RGP may be considered as the distribution of the remaining kWh, at a given time instance, until the failure of the component. In contrast to the remaining useful lifetime (RUL) as considered conventionally, the RGP is independent of the need of continuous operation. Thus, according to embodiments of the present invention, the RGP can directly be linked to the performance yield and thereby the cost involved in operation and maintenance.

The underlying method to estimate the remaining producible energy (RGP) may be based on a deep learning architecture, known as recurrent neural network (RNNs), as is schematically illustrated in FIG. 1. The network 1 is designed to analyse one or more data sets, i.e., input data 3, to estimate the remaining producible energy for a failure which is output as a probability distribution 5 by the neural network 1. In the case of a main bearing (bearing which supports the main rotation shaft of the wind turbine), the input data 3 may be defined over the set of features from wind turbine operational data and ambient condition data, namely measurements associated with ambient conditions, energy diffusion and rotational/movable path, and in addition other health indicators can be considered, for example indicators based on vibration.

The output space, i.e., output 5, may be defined as a parameterization of the tractable distribution over RGP (satisfying the underlying statistical model)—enabling expression the RGP in terms of probability rather than point measures. The training goal of such an RNN may be defined through a cost function and formulated in terms of the RGP of training turbines. A cost function may be a function depending on the wind turbine state, remaining power generation (remaining producible energy), and a parametrization of a probability distribution, where last mentioned is implicit dependent on the neural network weights. When training the neural network, i.e., adjusting the weights, the cost function will provide how the adjustments are made to conform with the properties described by the cost function, e.g., error minimization.

All training may be conducted on empirical and/or historical data. Such data might stem from other turbines or components of same or similar type undergoing the same or similar failure. The power production yield (probability distribution of the remaining producible energy) is output by the network 1 at the output layer as output 5.

An example of the estimated probability distribution of the remaining producible energy is illustrated in FIG. 2 in a graph having an abscissa 7 indicating the days until failure or recommended replacement and having a left ordinate 9 indicating the remaining producible energy in arbitrary units. As shaded areas, the probability distribution of the remaining producible energy is illustrated and labelled with reference sign 11. From the probability distribution 11, the median is illustrated as a curve 13 and the mode is indicated as a curve 15. The true remaining producible energy is illustrated as a curve 17.

The curve 19 indicates a measured vibration, wherein the ordinate 21 on the right-hand side indicates the vibration level in arbitrary units.

At the point in time 23 (120 days until failure or until recommended replacement) it is detected based on the vibration 19 that the main bearing suffers from a mechanical problem or partial damage, since the vibration 19 is above a threshold 24. From then on, a method of estimating replacement schedule according to an embodiment of the present invention is started using the neural network illustrated in FIG. 1.

Higher values of the vibration curve 19 indicate a higher risk of failure. The method provides a distribution over the remaining producible energy, i.e., a probability for each energy that it is actually the remaining producible energy. This distribution is provided for each time instance. The production yield can be retrieved from either the median or mode or set density shown as curves 13 or 15.

When the estimated remaining producible energy substantially reaches zero, the component is to be replaced, which may be indicated for example at the time point 25 (0 days until failure).

A control scheme then, according to an embodiment of the present invention, may adjust the power output to optimize the operation subjected to the maintenance planning. Wind forecast may allow the estimation of the income of electricity production within the failure period. In contrast to a fixed time frame (estimator RUL), this can be done without loss of generality in an RGP framework. Therefore, the RGP more accurately reflects the time and cost associated with respect to the operations of a wind turbine. Meanwhile, the RGP can also be used as a factor when addressing seasons of high and low traffics.

As can be taken from FIG. 2, the true remaining producible energy according to curve 17 monotonically decreases from the first indication of the damage (point in time 23) to the actual point in time 25 of replacement of the component. The curves 13 and 15 derived from the estimated probability distribution of the remaining producible energy are higher than the true remaining producible energy 17 until about 60 days until failure. After this point in time, the median and the mode 13 and 15, respectively, of the probability distribution approach the true remaining producible energy (curve 17) and slightly fall below this curve. However, the estimated remaining producible energy better and better corresponds to the true remaining producible energy, indicating the good reliability and accuracy of the method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of estimating replacement schedule of a mechanical component of a wind turbine, the method comprising:
   detecting a value of a physical quantity indicating a malfunction of the mechanical component of the wind turbine;
   estimating remaining producible energy until the mechanical component is to be replaced, wherein estimating is performed when the value of the physical quantity exceeds a threshold; and
   operating the wind turbine for optimizing power output based on the estimated remaining producible energy;
   wherein estimating the remaining producible energy uses machine learning and includes using a neural network which has been trained by training data from plural training wind turbines, the training data comprising training values of input parameters and a training value of at least one output parameter, the input parameters comprising at least one wind turbine operational parameter and/or at least one ambient condition parameter, the at least one output parameter being indicative for the remaining producible energy until the mechanical component is to be replaced.

2. The method according to claim 1, wherein the physical quantity indicating the malfunction of the component comprises a temperature, a noise, an electrical quantity related to power output, rotational speed, and/or friction.

3. The method according to claim 1, wherein the physical quantity indicating the malfunction of the component comprises a vibration.

4. The method according to claim 3, wherein the vibration is measured by a sensor close to the component.

5. The method according to claim 3, wherein the component is a bearing.

6. The method according to claim 5, wherein the bearing is a bearing of a main rotation shaft.

7. The method according to claim 1, wherein estimating the remaining producible energy is performed during power production of the wind turbine.

8. The method according to claim 1, wherein
the training data from plural training wind turbines includes training data from at least 50 training wind turbines.

9. The method according to claim 1, the training wind turbines comprising a same or similar component having same or similar malfunction.

10. The method according to claim 1, wherein estimating the remaining producible energy comprises using the neural network comprising:
supplying test values of the input parameters to the trained neural network, the test values pertaining to the wind turbine;
outputting, by the trained neural network, a probability distribution of the remaining producible energy pertaining to the wind turbine.

11. The method according to claim 10, wherein the probability distribution is given for plural points in time in the future.

12. The method according to claim 1, wherein, as estimation of the remaining producible energy at a desired point in time, one of:
a mean;
a median;
a mode; and/or
a set density
of the probability distribution at the desired point in time is used.

13. The method according to claim 1, wherein training the neural network comprises:
weighting the input parameters depending on the training data regarding their importance for arriving at the respective training value of the output parameter by applying a cost function.

14. The method according to claim 1, wherein the at least one wind turbine operational parameter comprises at least one of:
a power output;
a rotational speed of a rotation shaft at which plural rotor blades are mounted;
a torque of a generator;
energy diffusion;
construction characteristics of the component.

15. The method according to claim 1, wherein the at least one ambient condition parameter comprises at least one of:
a wind speed;
a wind turbulence;
a humidity;
a temperature.

16. The method according to claim 1, further comprising:
indicating to replace the component, if the remaining producible energy is smaller than an energy threshold.

17. An arrangement for estimating a replacement schedule of a mechanical component of a wind turbine the arrangement being adapted to control or perform a method according to claim 1.

18. The method according to claim 1, wherein the neural network is a recurrent neural network.

* * * * *